United States Patent [19]

Wakita et al.

[11] Patent Number: 5,158,731
[45] Date of Patent: Oct. 27, 1992

[54] FILM PROCESS OF MAKING AND ANTIBLOCKING

[75] Inventors: Kazuto Wakita, Tokyo; Isao Nagayasu, Osaka, both of Japan

[73] Assignee: Ube Industries, Ltd., Yamaguchi, Japan

[21] Appl. No.: 680,559

[22] Filed: Apr. 4, 1991

Related U.S. Application Data

[62] Division of Ser. No. 357,825, May 26, 1989, abandoned.

[30] Foreign Application Priority Data

Jun. 3, 1988 [JP]  Japan .................................. 63-135461

[51] Int. Cl.$^5$ ............................................. B29C 47/00
[52] U.S. Cl. ................................... 264/211; 524/423; 524/436; 524/787
[58] Field of Search ................ 264/211; 524/423, 436, 524/787

[56] References Cited

U.S. PATENT DOCUMENTS 4,562,230  12/1985  Fukui et al. ............................ 525/74

FOREIGN PATENT DOCUMENTS 56-149318  11/1981  Japan .................................. 423/554

*Primary Examiner*—Leo B. Tentoni
*Attorney, Agent, or Firm*—Finnegan, Henderson, Farabow, Garrett and Dunner

[57] ABSTRACT

Fibrous magnesium oxysulfate particles having a length of 10 to 100 μm and a thickness of less than 1 μm are used as an antiblocking agent for plastic films, especially polyolefin resin films.

1 Claim, No Drawings

FILM PROCESS OF MAKING AND ANTIBLOCKING

This is a division of application Ser. No. 07/357,825, filed May 26, 1989 and now abandoned.

BACKGROUND OF THE INVENTION (1) Field of the Invention

The present invention relates to an anti-blocking agent for plastic film, which is useful for producing antiblocking plastic films having an excellent antiblocking property and lubricity, and useful as a food-packing, fiber-packing, and other industrial post materials.

(2) Description of the Related Arts

Usually, the conventional antiblocking agent for plastic films comprises silica, but these plastic films containing silica particles as an antiblocking agent are disadvantageous in that the resultant anti-blocking plastic films exhibit (1) a reduced transparency, (2) less glossiness, (3) a lower scratch resistance, and (4) an unsatisfactory color. Although attempts were made, before the present invention, to find a new antiblocking agent equal to silica, these attempts were not successful, and thus silica is still used as the antiblocking agent.

SUMMARY OF THE INVENTION

An object of the present invention is to provide an antiblocking agent for plastic films, which has the same antiblocking activity as a conventional antiblocking agent consisting essentially of silica particles, and enables the resultant antiblocking plastic films to exhibit a satisfactory transparency, glossiness, scratch resistance, and color.

The above-mentioned object can be obtained by the antiblocking agent of the present invention for plastic films, which comprises fibrous magnesium oxysulfate particles.

The fibrous magnesium oxysulfate particles consist of a compound represented generally by the formula:

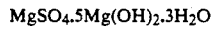

$MgSO_4.5Mg(OH)_2.3H_2O$

DESCRIPTION OF THE PREFERRED EMBODIMENT

The fibrous magnesium oxysulfate particles usable for the present invention are in the form of a white fine powder, preferably consisting of needle-shaped crystals, and preferably having a true specific gravity of 2.3, a bulk density of 0.1 g/cm$^3$ or less, more preferably 0.08 g/cm$^3$ or less, a particle length of 10 to 100 µm, more preferably 10 to 50 µm, a particle thickness of less than 1 µm, more preferably less than 0.5 µm, and a specific surface area of less than 10 m$^2$/g, more preferably less than 8 m$^2$/g, determined by the BET method.

The fibrous magnesium oxysulfate particles can be produced by, for example, a method in which magnesium oxide or magnesium hydroxide particles are dispersed in an aqueous solution of magnesium sulfate and then the aqueous solution dispersion is heated, or another method in which magnesium hydroxide particles are dispersed in a sulfuric acid aqueous solution and the dispersion is heated. Japanese Unexamined Patent Publication No. 56-149318 concretely discloses specific processes for producing the fibrous magnesium oxysulfate particles and properties of the products.

In the application of the antiblocking agent of the present invention, preferably the fibrous magnesium oxysulfate particles are mixed, in an amount of 200 to 10,000 ppm, more preferably 500 to 3,000 ppm, into a matrix consisting essentially of a thermoplastic resin.

When the amount of the antiblocking agent in the plastic resin matrix is too small, the resultant plastic resin film exhibits an unsatisfactory antiblocking activity, and when the content of the antiblocking agent in the matrix is too large, the resultant plastic resin film exhibits a saturated antiblocking activity and reduced physical properties.

The plastic resin to be mixed with the antiblocking agent of the present invention is not restricted to thermoplastic resins of a specific type and having a specific molecular weight, and preferably, the thermoplastic resin is selected from polyamide resins, polyester resins, polypropylene resins, polyethylene resins, polyvinylidene chloride resins, ethylene-vinyl acetate copolymer resins, copolymer resins of two or more of the above-mentioned monomers and modified polymer resins of the above-mentioned polymers and copolymers.

Preferably, the plastic polymer resin is selected from polyolefin resins, for example, polypropylene and polyethylene homopolymer resins and ethylene-propylene copolymer resins.

The antiblocking agent of the present invention can be incorporated into the plastic resin matrix by any known mixing method, for example, melt kneading, melt extruding, and rolling. Also, the mixture of the plastic resin matrix with the antiblocking agent can be formed into a film by any shaping method, for example, by an extruding method or an inflation method.

The plastic film containing the antiblocking agent of the present invention preferably has a thickness of 10 to 200 µm.

Also, the plastic film containing antiblocking agent of the present invention can further contain an additive comprising at least one of antioxidants, ultraviolet ray-absorbing agents, coloring materials, slipping agents and other types of antiblocking agents, as long as the additive does not cause a reduction or loss of the effect of the antiblocking agent of the present invention.

SPECIFIC EXAMPLES

The present invention will be further explained by way of the following examples, which are representative only and do not restrict the scope of the present invention.

EXAMPLE 1 AND COMPARATIVE EXAMPLES 1 and 2

In Example 1, a propylene homopolymer powder having a melt flow index of 8.0 g/10 min was mixed with 1,000 ppm of an antioxidant consisting of BHT (2,6-di-t-butylhydroxytoluene), 900 ppm of a slipping agent consisting of erucinic acid amide, and 2,000 ppm of an antiblocking agent of the present invention consisting of fibrous magnesium oxysulfate particles available under the trademark of MOSHAIJI and made by UBE INDUSTRIES CO., in the form of needle-shaped crystals having a length of 15 µm, a thickness of 0.3 µm, and a specific surface area of 8 m$^2$/g, using a Henschel mixer (made by Mitsui-Miike Co.), and the resultant mixture was melt-extruded at a temperature of 220° C. through a pellet-forming extruder.

The resultant pellets were melt-shaped into a tubular film by using a water-cooled inflation film-forming machine having an extrusion nozzle diameter of 45 mm, under the following conditions.

| Portion | Temperature distribution of the film-forming machine | | | | |
|---|---|---|---|---|---|
| | $C_1$ | $C_2$ | $C_3$ | Adapter | Die |
| Temperature (°C.) | 180 | 200 | 200 | 220 | 200 |

Water temperature: 20° C.
Taking up speed: 35 m/min

The resultant polypropylene film had a thickness of 30 μm and a flattened tube width of 200 mm.

The antiblocking property of the resultant tubular film was tested by opening the tubular film and evaluating the resultant film based on the following five classes.

| Class | Property |
|---|---|
| 5 | Immediately after the film-forming procedure, the resultant tubular film was easily directly opened. |
| 4 | Immediately after the film-forming procedure, the resultant tubular film was easily opened by a light crumpling of the film by hand. |
| 3 | Immediately after the film-forming procedure, the resultant tubular film was opened by a strong crumpling of the film by hand. |
| 2 | Immediately after the film-forming procedure, the resultant tubular film was opened by a very strong crumpling of the film by hand. |
| 1 | Immediately after the film-forming procedure, the resultant tubular film was opened only by using an adhesive tape. |

Note: When an inside metal surface of a film-forming machine is abraded by a polymer melt containing the antiblocking agent, the resultant polymer film is colored by the abraded metal. The extent of the coloration of the polymer film can be confirmed by observing the end face of the film. Accordingly, the color of the end face of the exemplified film was observed by the naked eye, at an edge face of a roll formed of a wound film.

The results of the above tests are shown in Table 1.

In Comparative Example 1, the same procedures as those described in Example 1 were carried out except that the antiblocking agent was not mixed into the polypropylene resin. The results of the tests are shown in Table 1.

In Comparative Example 2, the same procedures as in Example 1 were carried out except that the antiblocking agent of the present invention was replaced by 2,000 ppm of a conventional antiblocking agent consisting of silica powder and available under the trademark of Sailoid 244, made by Fuji Debison Co.

The results of the tests are shown in Table 1.

TABLE 1

| Item | | Testing method ASTM | Comparative Example 1 | Comparative Example 2 | Example 1 |
|---|---|---|---|---|---|
| Antiblocking agent | Type | — | None | Silica particle | Fibrous magnesium oxysulfate particles |
| | Amount (ppm) | — | — | 2,000 | 2,000 |
| Resultant polypropylene film | Haze (%) | D1003 | 1.2 | 3.0 | 2.5 |
| | Glossiness (%) | D523 | 130 | 105 | 115 |
| | Static friction coefficient (*1) | D1894 | >1.0 | 0.69 | 0.56 |
| | Dynamic friction coefficient (*2) | D1894 | >1.0 | 0.68 | 0.52 |
| | Tensile modulus of elasticity (kg/cm²) MD(*3) | D882 | 7,930 | 7,480 | 7,780 |
| | TD(*4) | D882 | 7,520 | 7,450 | 7,450 |
| | Tensile yield point strength (kg/cm²) MD | D882 | 248 | 230 | 241 |
| | TD | D882 | 219 | 215 | 216 |
| | Tensile break point strength (kg/cm²) MD | D882 | 792 | 742 | 790 |
| | TD | D882 | 748 | 693 | 732 |
| | Ultimate elongation (%) MD | D882 | 764 | 748 | 778 |
| | TD | D882 | 821 | 830 | 800 |
| | Antiblocking property of film to film | — | 1 | 4 | 5 |
| | Color or end face of film | — | Light black | Light brown | White |

Note:
(*1), (*2) - The inside surface portions of the tubular film were rubbed against each other.
(*3) - MD: Longitudinal direction of the film
(*4) - TD: Transverse direction of the film Table 1 clearly shows that the polypropylene film of Example 1 containing the fibrous magnesium oxysulfate particles as the antiblocking agent of the present invention exhibits a greater transparency, glossiness, lubricity, and antiblocking property than the comparative films of Comparative Examples 1 and 2. Also, since the end face of the polypropylene fiber of Example 1 had a white appearance, it was confirmed that the fibrous magnesium oxysulfate particles substantially do not abrade the inside metal surface of the film-forming machine.

Accordingly, it is clear that the fibrous magnesium oxysulfate particles are unexpectedly excellent for use as an antiblocking agent for plastic films.

EXAMPLE 2 AND COMPARATIVE EXAMPLE 3

In Example 2, a propylene homopolymer powder having a melt flow index of 2.0 g/10 min was mixed with 1,000 ppm of an antioxidant consisting of 2,6-di-t-butylhydroxytoluene (BHT) and 650 ppm of fibrous magnesium oxysulfate particles having a length of 15 μm, a thickness of 0.3 μm and a specific surface area of 8 m²/g, and the resultant mixture was melt-extruded at a temperature of 220° C., and converted to pellets, in the same manner as in Example 1.

The resultant pellets were converted to a sheet having a thickness of 1 mm, by a compression molding method at a molding temperature of 220° C. and a pressure of 100 kg/cm², for a preheating time of 2 minutes and a heat-compressing time of 2 minutes, and the resultant sheet was rapid-cooled in a cooling water bath at a water temperature of 20° C.

The sheet was bi-axially drawn, using a bi-axial drawing machine, at a longitudinal draw ratio of 5 and a transverse draw ratio of 8, (at an area expansion ratio of 5×8=40) at a temperature of 140° C.

The resultant drawn film had a thickness of 20 μm and exhibited a satisfactory transparency and glossiness.

Ten pieces of the drawn film were superimposed on each other, and the resultant superimposed film pieces were pressed under a load of 36 g/cm² and left in a constant temperature oven at a temperature of 40° C. and a relative humidity (RH) of 80% for 40 hours.

After the above press treatment, the film pieces were easily peeled apart by hand.

In Comparative Example 3, the same procedures as mentioned in Example 2 were carried out except that an antiblocking agent was not mixed in the polypropylene film. The resultant comparative film had a satisfactory transparency and glossiness. After the above press treatment, the superimposed film pieces were in the form of a plate and could not be easily peeled apart by hand.

The results of Example 2 and Comparative Example 3 clearly indicate that the fibrous magnesium oxysulfate particles are very effective as an antiblocking agent for the plastic films.

EXAMPLE 3

The same procedures as in Example 1 were carried out with the following exception.

The polypropylene was replaced by a low density polyethylene having a melt flow index of 2.0 g/10 min, and the fibrous magnesium oxysulfate particles were mixed in an amount of 1,000 ppm in the polyethylene.

The polyethylene pellets were converted to a tubular film by an air-cooled inflation film-forming machine, at a resin temperature of 170° C., and the resultant tubular film had a thickness of 30 μm and a flattened tube width of 200 mm.

Immediately after the film-forming procedure, the resultant tubular film exhibited an excellent opening property and a very small haze of 5.5%.

EXAMPLE 4

The same procedures as in Example 1 were carried out, with the following exception.

The polypropylene was replaced by a copolymer of ethylene (90% by weight) with vinyl acetate (10% by weight) having a melt flow index of 0.3 g/10 min, and the fibrous magnesium oxysulfate particles were used in an amount of 1,200 ppm.

The air-cooling inflation film-forming procedure was carried out at a resin temperature of 130° C. and the resultant tubular film had a thickness of 30 μm and a flattened tube width of 200 mm.

The resultant tubular film exhibited an excellent opening property even immediately after the film-forming procedure, and a small haze of 9.0%.

COMPARATIVE EXAMPLE 4

The same procedures as described in Example 1 were carried out except that the fibrous magnesium oxysulfate particles were used in a large amount of 50,000 ppm.

The resultant film had an undesirable appearance due to the formation of gel particles, which were considered to consist of secondary agglomerates of the fibrous magnesium oxysulfate particles in the surface portion of the film, and thus was commercially useless.

We claim:
1. A method of producing an antiblocking thermoplastic film, comprising mixing 200 to 10,000 ppm of an antiblocking agent consisting essentially of fibrous particles of magnesium oxysulfate of the formula:

$$MgSO_4.5Mg(OH)_2.3H_2O,$$

in the form of needle-shaped crystals with a length of 10 to 100 μm and a thickness of less than 1 μm and having a specific surface area of less than 10 m²/g, determined by the BET method, into a melt of a thermoplastic resin; and forming the mixture of the thermoplastic resin melt with the antiblocking agent particles into a film.

* * * * *